(12) United States Patent
Bruns (10) Patent No.: US 11,728,629 B1
(45) Date of Patent: Aug. 15, 2023

(54) POWER LINE INSTALLATION

(71) Applicant: David M. Bruns, Taylorville, IL (US)

(72) Inventor: David M. Bruns, Taylorville, IL (US)

( * ) Notice: Subject to any disclaimer, the term of this patent is extended or adjusted under 35 U.S.C. 154(b) by 22 days.

(21) Appl. No.: 17/024,817

(22) Filed: Sep. 18, 2020

Related U.S. Application Data (60) Provisional application No. 62/909,270, filed on Oct. 2, 2019.

(51) Int. Cl.
*H02G 1/04* (2006.01)
*F16D 59/00* (2006.01)
*F16D 63/00* (2006.01)

(52) U.S. Cl.
CPC .............. *H02G 1/04* (2013.01); *F16D 59/00* (2013.01); *F16D 63/008* (2013.01)

(58) Field of Classification Search
CPC .......... H02G 1/04; F16D 59/00; F16D 63/008
See application file for complete search history.

(56) References Cited

U.S. PATENT DOCUMENTS 4,019,715 A * 4/1977 Vugrek .................... H02G 1/04
254/394

* cited by examiner

*Primary Examiner* — Nirvana Deonauth
(74) *Attorney, Agent, or Firm* — Philip L. Bateman (57) ABSTRACT

Power lines are installed with a rope brake apparatus that enables a rope to be suspended above the ground during installation and that thereby eliminates the need to block off the ground between power poles. The rope brake apparatus has a pair of opposed cam cleats mounted on a base adjacent each other for allowing movement of a rope between them in one direction and for preventing movement of a rope between them in an opposite direction.

3 Claims, 12 Drawing Sheets

POWER LINE INSTALLATION

CROSS-REFERENCE TO RELATED APPLICATION

This application claims the benefit of U.S. Provisional Application Ser. No. 62/909,270, Oct. 2, 2019.

FIELD OF THE INVENTION

This invention relates to electric power transmission. More particularly, this invention relates to the installation of power lines.

BACKGROUND OF THE INVENTION

Electric power is transmitted from power plants (or other place of generation) to electrical substations (or place of use) in metal power lines. The power is commonly in the form of high voltage three-phase alternating current in three separate power lines and one neutral line. The four lines are generally uninsulated wires or cables and are generally located overhead on poles where they are not likely to be contacted by persons. The three current-carrying lines are commonly suspended on insulators that are mounted on a crossbar attached to each pole. The neutral line is commonly suspended in a clevis (U-shaped bracket) on each pole a short distance below the crossbar. The term "power line" is used herein to refer to individual current-carrying lines, neutral lines, and combinations thereof depending on the context.

Current-carrying power lines are generally installed using a two stage procedure. The procedure is described for a single line. The procedure is repeated for each line. The first step of the first stage is to attach a temporary receiver (commonly known as an arm clamp) for each line on each crossbar on each pole in the span. Each receiver is secured to the crossbar with two bolts. A pulley (commonly known as a stringing block) is then attached to each crossbar receiver. A long section of non-conducting rope from the proximate end of the span is then pulled through the pulleys and draped over the crossbars for each line.

The first step of the second stage of the installation procedure is to attach the leading end of the rope to the metal power line on a reel at the distal end of the span. The rope and power line are then pulled back through the pulleys until the power line runs the entire span. The rope is then disconnected from the power line, the power line is removed from the pulleys, and the power line is attached to insulators on the crossbars. The neutral line is generally installed in a similar manner except that the pulley is tied to the pole near the clevis receiver or temporarily attached in a similar manner.

Figure 1:
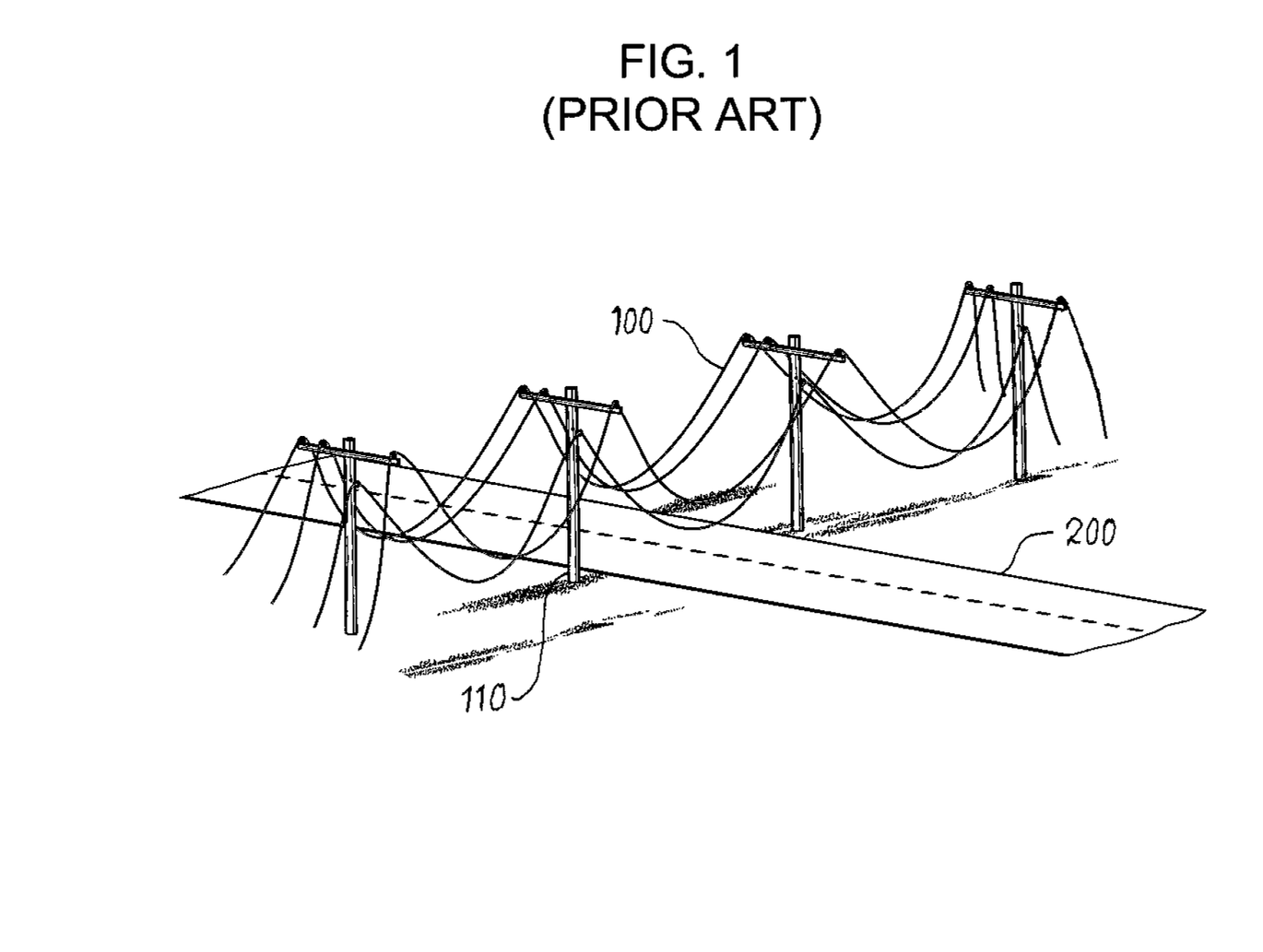
FIG. 1 is a perspective view of a prior art installation of four ropes for three current-carrying lines and one neutral line on multiple poles.
Figure 2:
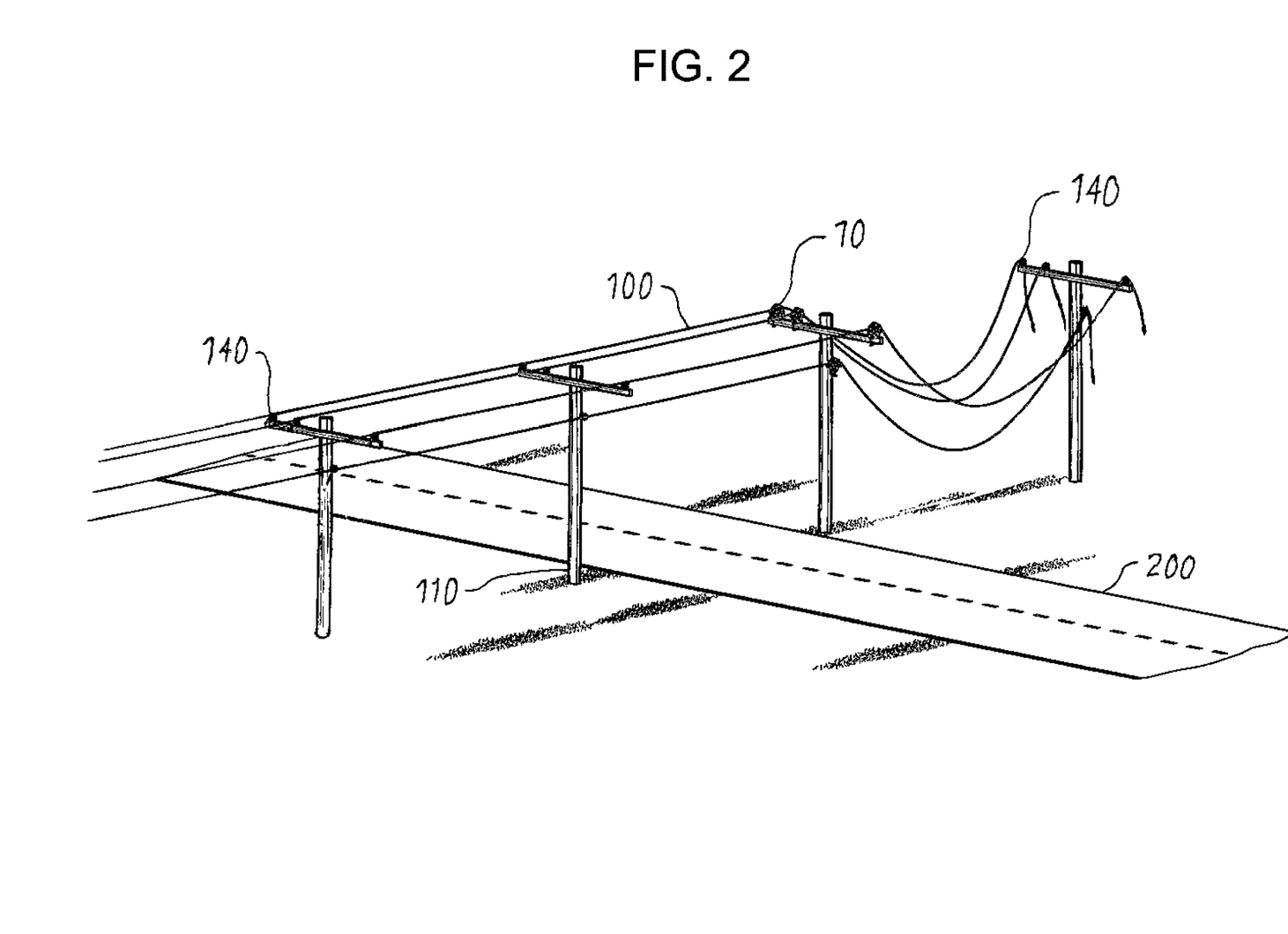
FIG. 2 is a perspective view of the installation of four ropes for three current-carrying lines and one neutral line using the rope brake apparatus, assembly, and method of this invention.

The power lines often cross roads or other areas that must be blocked off during the first stage of the installation because the ropes droop or drop completely to the ground. FIG. 1 illustrates such a step in the installation of a power line that crosses a road 200. In FIG. 1, four ropes 100 (one each for three current-carrying lines and a neutral line) are being installed on multiple poles 110. In FIG. 1, the rope machines (not shown) that supply the ropes are to the left and the wire reels (not shown) are to the right. Workers are at risk during any operation that stops traffic on a road. Furthermore, permits must be obtained before interrupting traffic on certain highways and railroads. It would be much more efficient and safer to install a power line in such a way that the ropes do not drop down to the ground on the road as shown in FIG. 2.

Accordingly, there is a demand for an improved apparatus for installing power lines. There is also a demand for an improved assembly for installing power lines. There is also a demand for an improved method of installing power lines.

SUMMARY OF THE INVENTION

A general object of this invention is to provide an improved apparatus for installing power lines. Another general object is to provide an improved assembly for installing power lines. Another general object is to provide an improved method for installing power lines.

I have invented an improved brake apparatus for installing power lines. The rope brake apparatus comprises: (a) a base having an upper surface and a lower surface, the lower surface having a projecting member for attachment to a receiver; and (b) a pair of opposed cam cleats mounted on the upper surface of the base adjacent each other for allowing movement of a rope between them in one direction and for preventing movement of a rope between them in an opposite direction.

I have also invented an improved assembly for installing power lines. The assembly comprises: (a) a power pole; (b) a receiver mounted on the power pole; and (c) a rope brake apparatus attached to the receiver, the rope brake apparatus comprising: (i) a base; (ii) a pair of opposed cam cleats mounted on the base adjacent each other for allowing movement of a rope between them in one direction and for preventing movement of a rope between them in an opposite direction; and (iii) a means for attaching the rope brake apparatus to the receiver.

I have further invented an improved method for installing power lines. The method comprises: (a) obtaining a power pole with a receiver; (b) obtaining a rope; (c) attaching to the receiver a rope brake apparatus comprising: (i) a base (ii) a pair of opposed cam cleats mounted on the base adjacent each other for allowing movement of the rope between them in one direction and for preventing movement of the rope between them in an opposite direction; and (iii) a means for attaching the rope brake apparatus to the receiver; and (d) running the rope through the cam cleats.

The apparatus, assembly, and method of this invention enable a rope to be suspended above the ground during installation and to thereby eliminate the need to block off the ground under the rope.

DETAILED DESCRIPTION OF THE INVENTION

Figure 3:
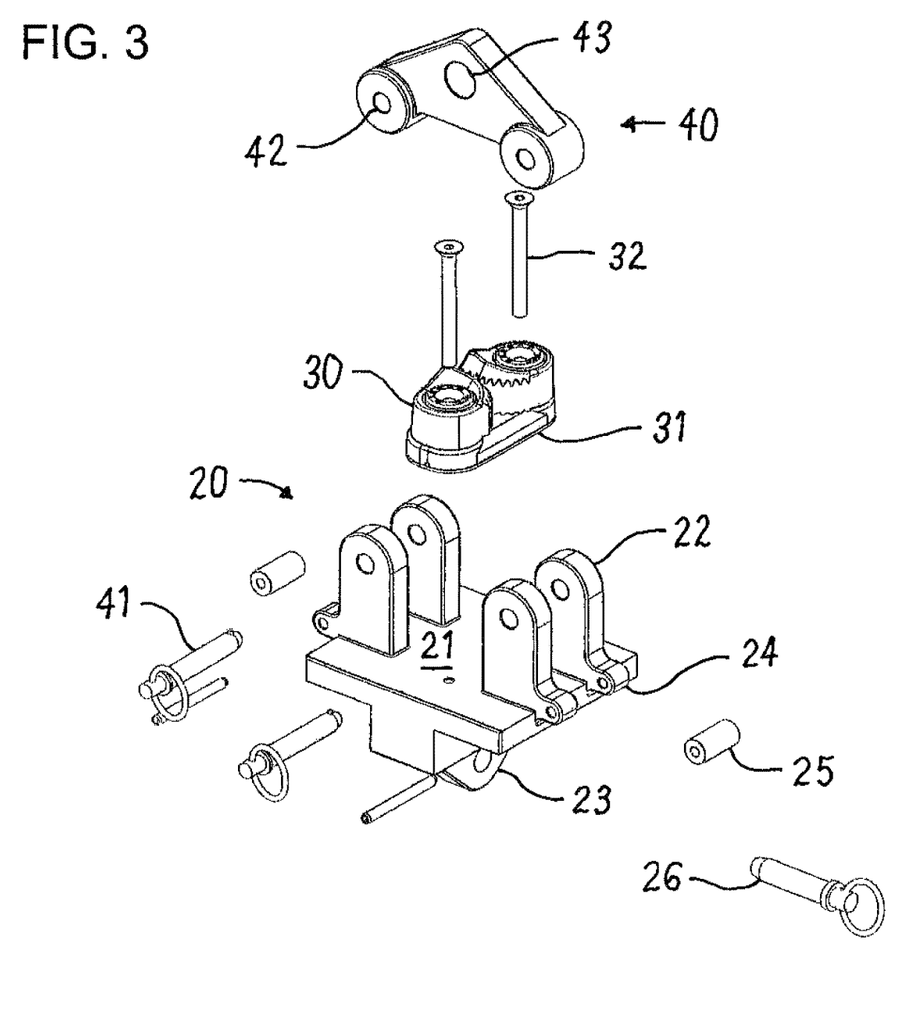
FIG. 3 is an exploded top perspective view of the rope brake apparatus of this invention.
Figure 4:
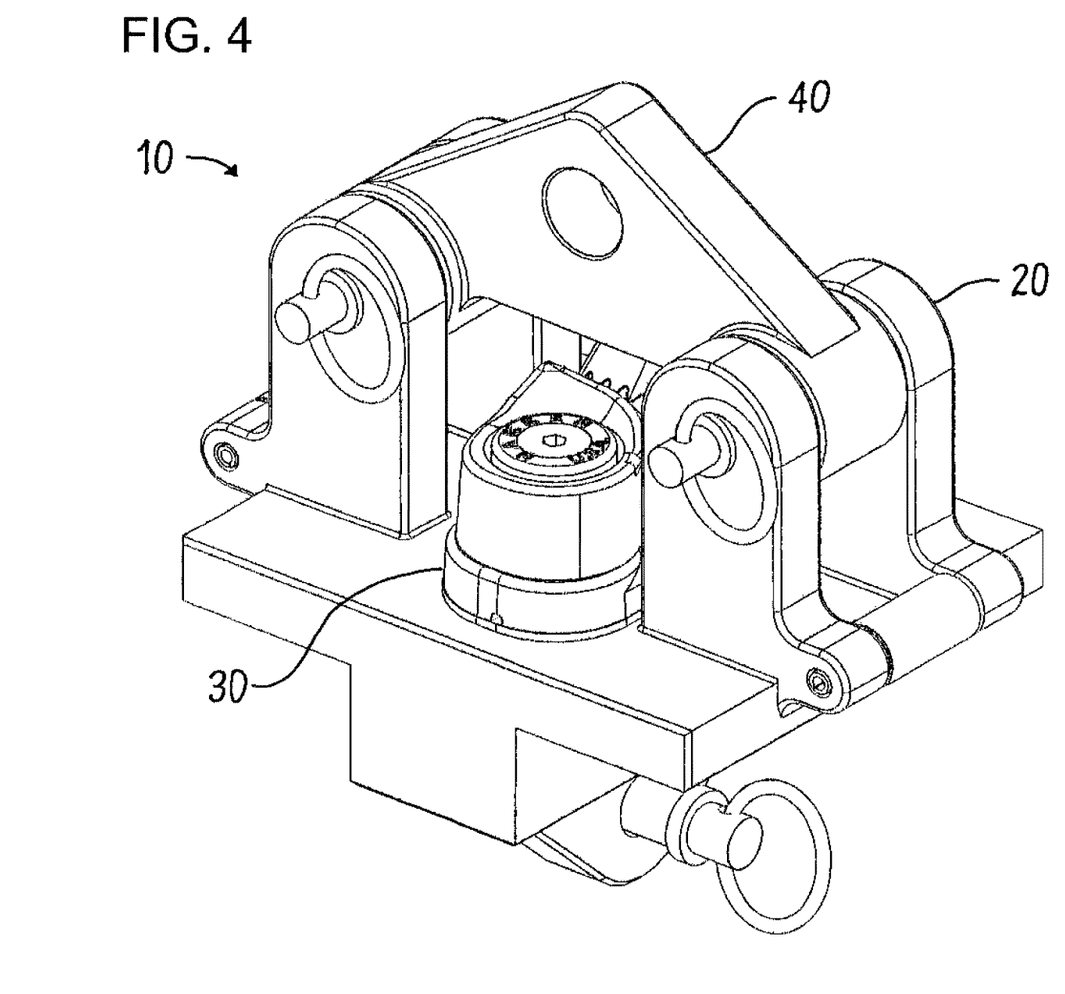
FIG. 4 is an assembled view thereof.
Figure 5:
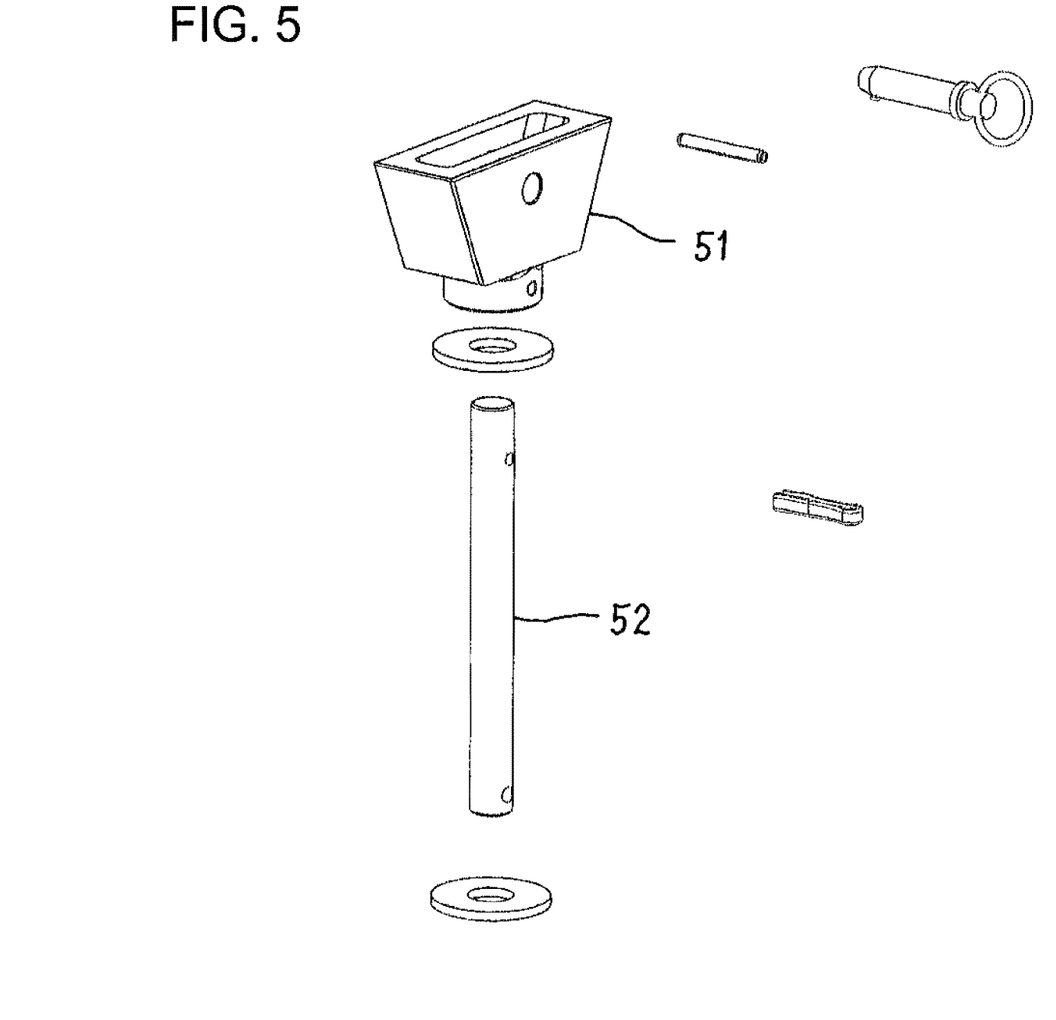
FIG. 5 is an exploded top perspective view of the clevis receiver of this invention.
Figure 6:
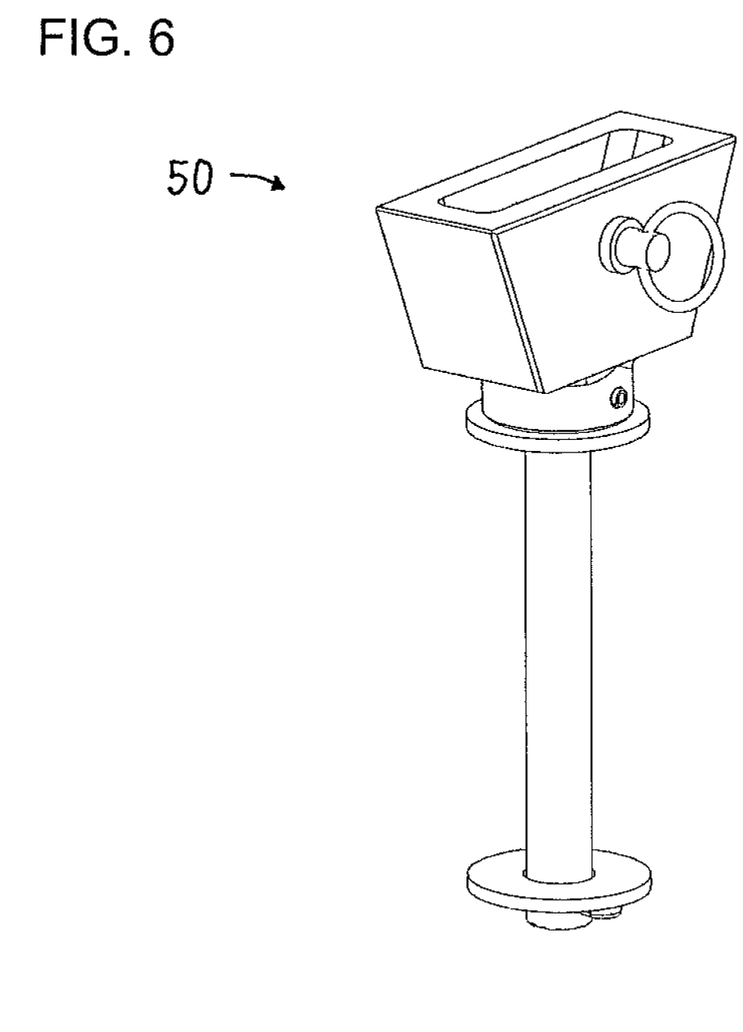
FIG. 6 is an assembled view thereof.
Figure 7:
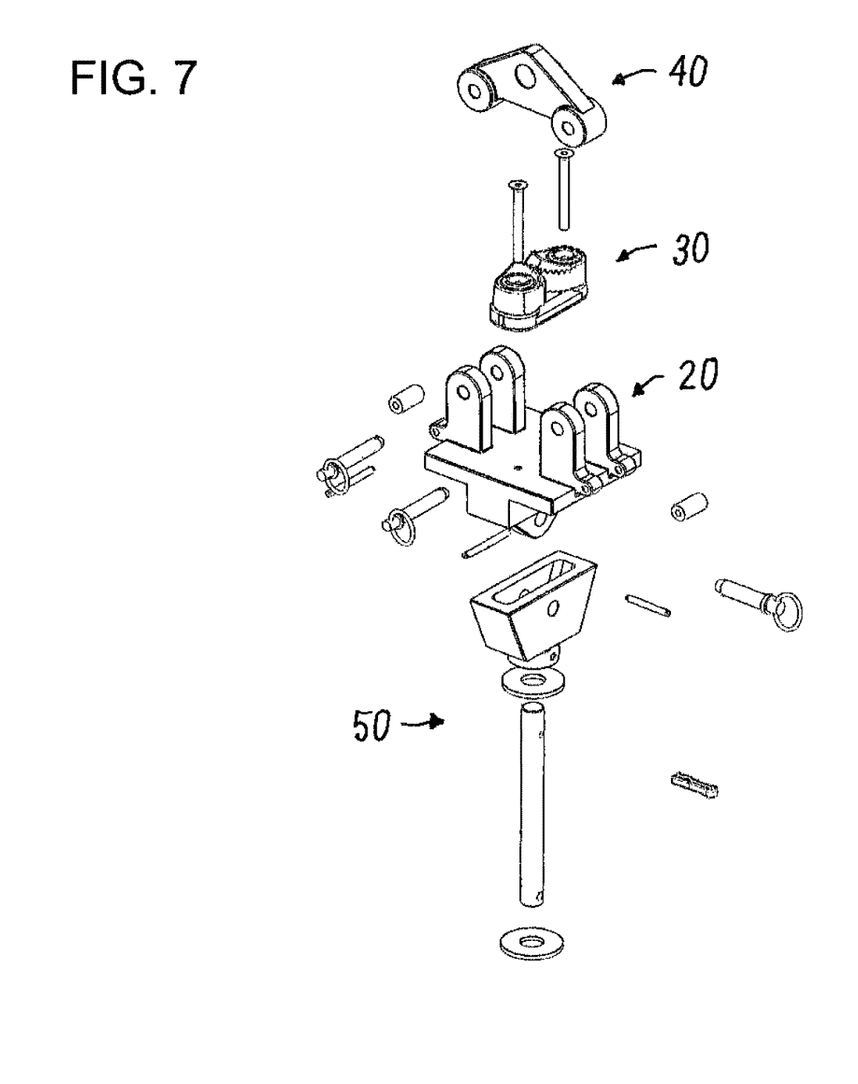
FIG. 7 is an exploded top perspective view of the rope brake apparatus of this invention with the clevis receiver.
Figure 8:
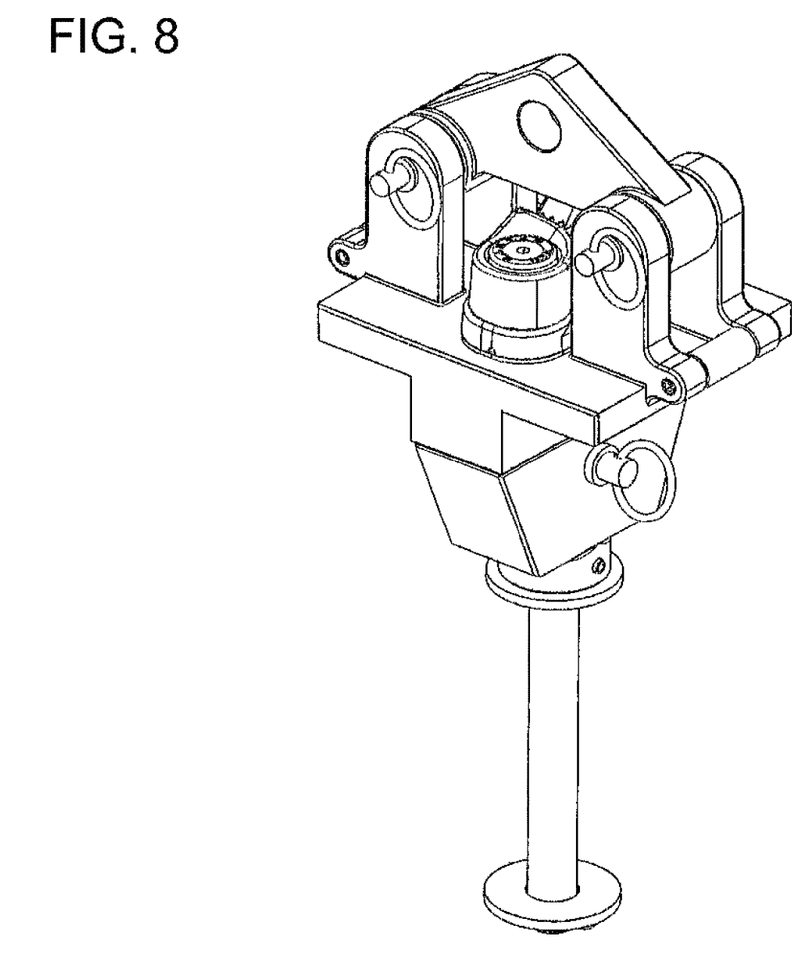
FIG. 8 is an assembled view thereof.
Figure 9:
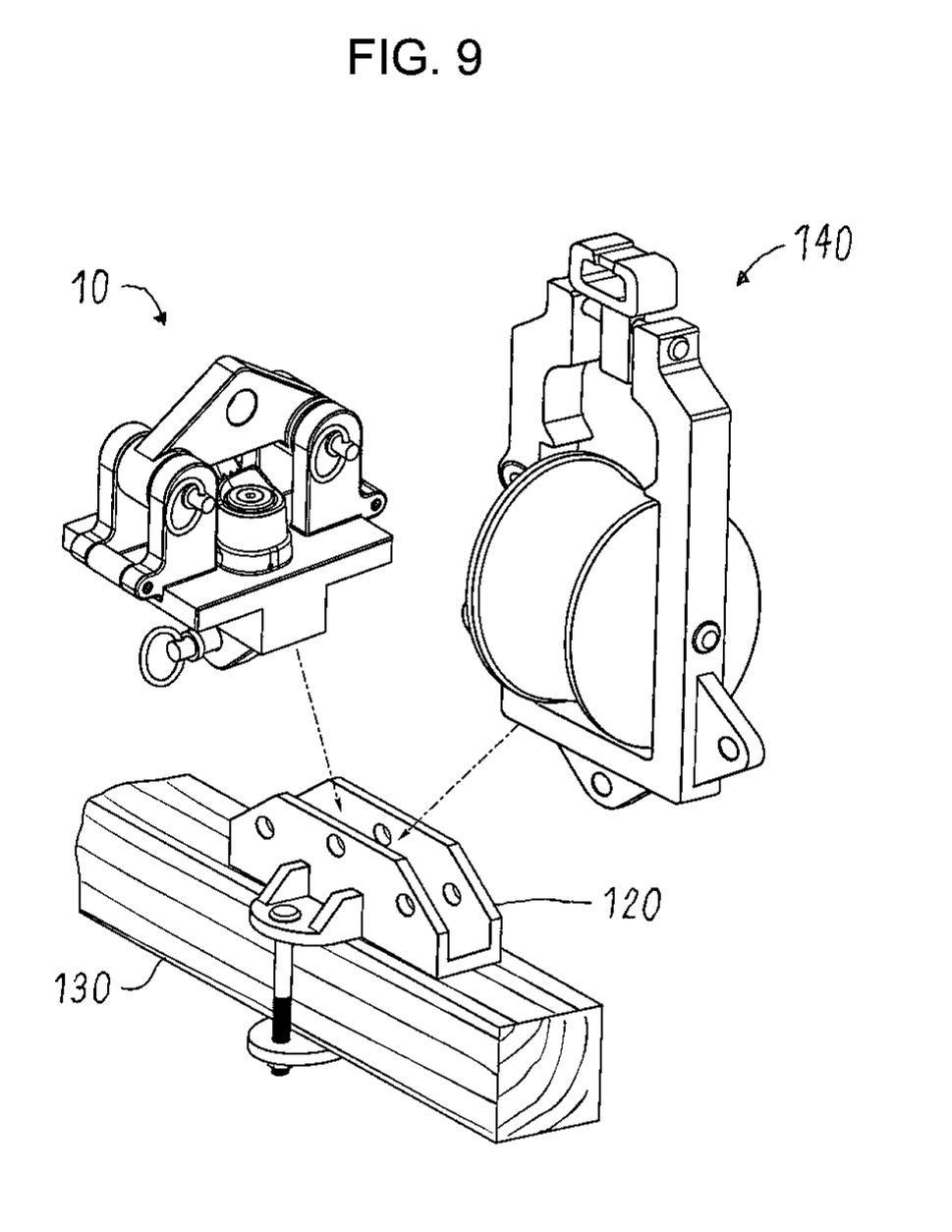
FIG. 9 is a perspective view of the rope brake apparatus of this invention, a conventional pulley, and a conventional crossbar receiver.

This invention is best understood by reference to the drawings. Referring first to FIGS. 3 and 4, a preferred embodiment of the rope brake apparatus 10 of this invention holds a rope (not shown) and allows movement of the rope in only one direction. The term "rope" is used herein to refer to all types of non-conducting ropes of natural or synthetic materials. Natural materials include hemp, linen, cotton, jute, sisal, and the like. Synthetic materials include nylon, polyesters, polyethylene, polypropylene, aramids, acrylics, and the like. The apparatus comprises three major components: a base 20, a pair of opposed cam cleats 30, and a retainer 40. The apparatus also comprises multiple screws and pins. As shown in FIG. 9, the rope brake apparatus fits into the same conventional crossbar receiver 120 mounted on a crossbar 130 as a conventional pulley 140.

The base 20 of the rope brake apparatus has a flat upper surface 21 for accepting the opposed cam cleats. The upper surface of the base also has two pairs of upwardly extending brackets 22 for holding the retainer. The lower surface of the base has a downwardly extending projecting member 23 for attachment to the spaced apart brackets of the receiver. As explained below, other means for attachment to different types of receivers are also suitable. The front and rear of the base have outwardly extending brackets 24 for holding roll pins 25. The roll pins facilitate movement of the rope through the apparatus. A pin 26 secures the rope brake apparatus to the receiver.

The opposed cam cleats 30 are adjacent each other and are spring loaded so they contact each other unless separated by a rope. The cam cleats preferably have ribs, grooves, teeth, or the like to provide a secure connection to the rope. The opposed cam cleats are preferably attached to a platform 31 and are preferably attached to the base with screws 32. Cam cleats are articles of commerce and are widely used in boating.

The retainer 40 is secured within the upwardly extending brackets of the base with pins 41. The retainer holds the rope in position between the opposed cam cleats. The retainer preferably has three holes. The two holes at the opposite ends 42 are used for attachment to the base. The central hole 43 is used to hang the apparatus from an overhead receiver as described below.

Referring now to FIGS. 5 to 8, the rope brake apparatus preferably includes a clevis receiver 50 if it is going to be used with a clevis. The clevis receiver is useful because common methods of temporarily attaching a pulley at or near the clevis are unsatisfactory for temporarily attaching the rope brake apparatus. The clevis receiver has a funnel 51 for receiving the downwardly projecting member of the base of the rope brake apparatus. The clevis receiver also has a rod 52 for insertion into the clevis.

Figure 10:
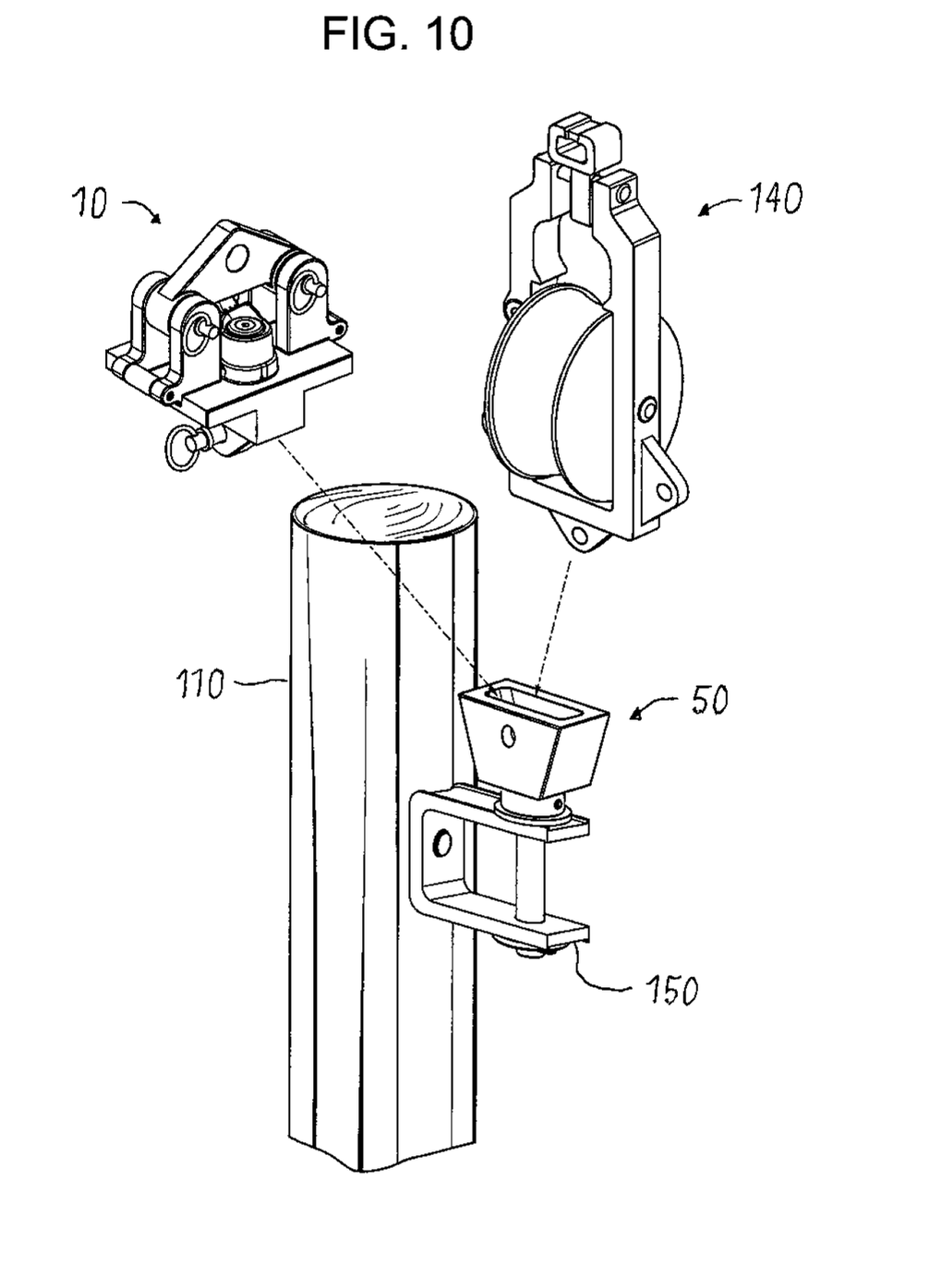
FIG. 10 is a perspective view of the rope brake apparatus of this invention, a conventional pulley, and a conventional clevis receiver.

The use of the rope brake apparatus can now be considered. Referring now to FIGS. 9 and 10, the first step is to attach a conventional crossbar receiver 120 to a crossbar 130 on a power pole in a conventional manner. If a neutral line is being installed, the first step preferably includes attaching a clevis receiver to a clevis 150. The term "power pole" is used herein to refer to any structure to which elevated power lines are attached. The apparatus of this invention is then placed into the crossbar receiver in a similar way to a conventional pulley 9 as shown in FIG. 9 and then secured with pin 26. For the installation of a neutral line, the apparatus is placed into the clevis receiver in the clevis as shown in FIG. 10. A rope 100 is then passed through the opposed cam cleats and under the retainer. The rope is then pulled through the apparatus. The cam cleats allow movement of the rope in the forward direction, but prevent movement of the rope in the opposite direction. This opposition prevents the rope from drooping down near or onto the ground adjacent the power pole.

Figure 11:
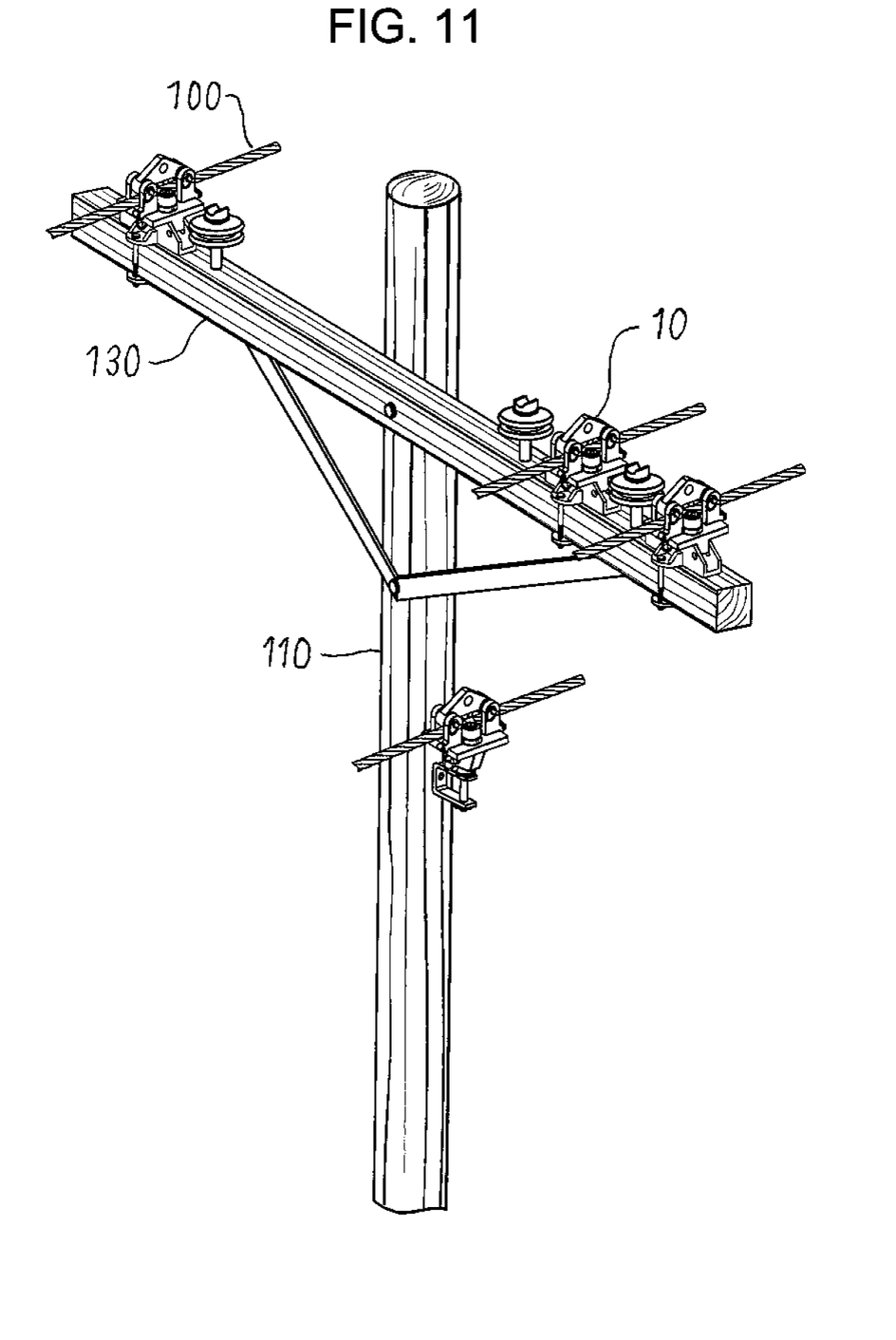
FIG. 11 is a perspective view of four assemblies of this invention with four ropes for three power lines on a crossbar and a neutral line on a pole.
Figure 12:
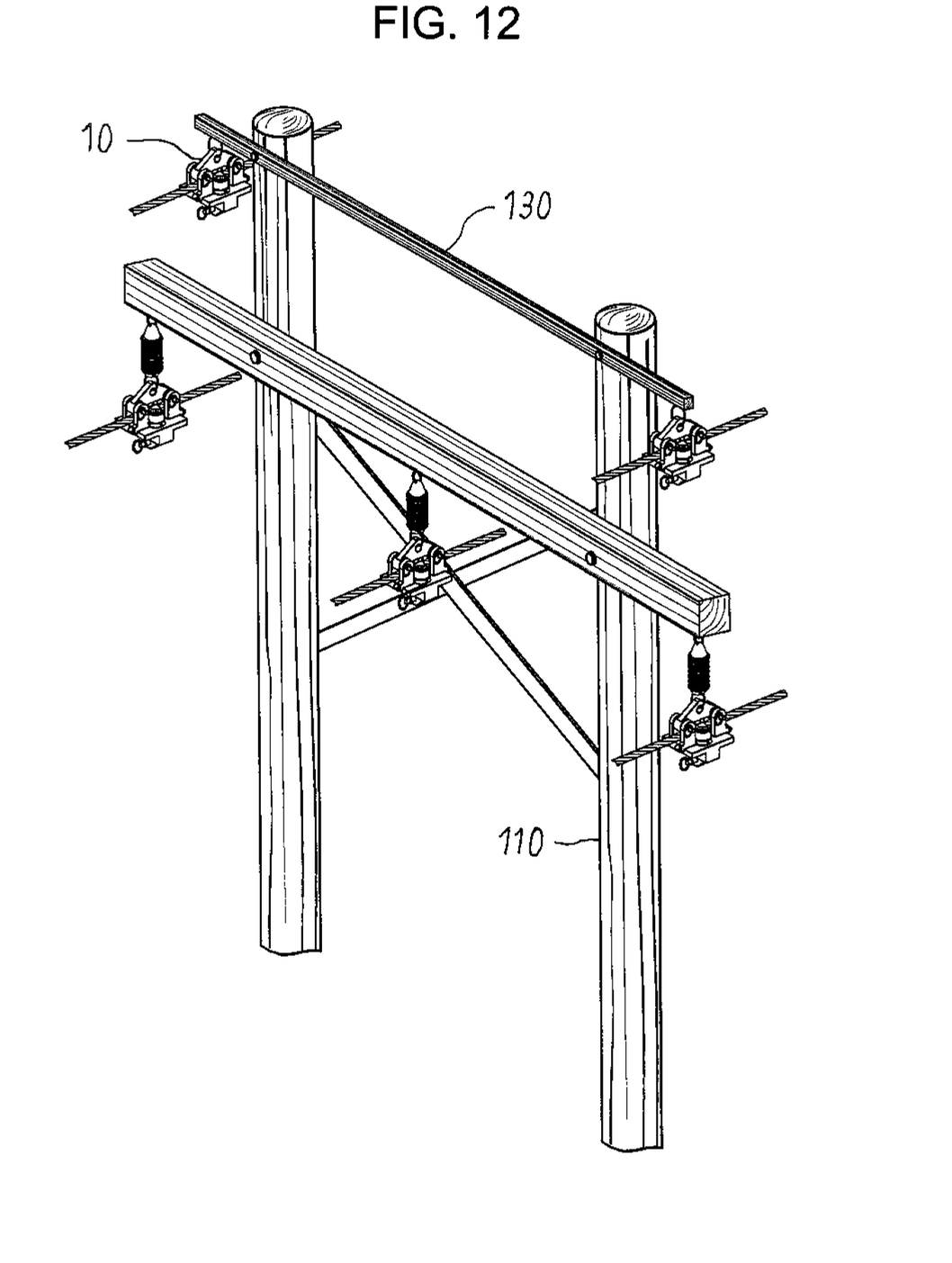
FIG. 12 is a perspective view of five assemblies of this invention with five ropes for three power lines and two neutral lines suspended from two crossbars.

Many installations require the simultaneous installation of three current-carrying lines and one neutral line on multiple power poles as shown in FIG. 11. FIG. 11 illustrates a common distribution arrangement with three ropes for power lines on a crossbar and one rope for a neutral line on a pole-mounted clevis. While most receivers are placed on the upper surface of crossbars and in a clevis on the side of the pole, some receivers are suspended (hung) from crossbars in transmission installations. In this situation, the apparatus is attached to the hanging receiver with a fastener that passes through the central hole in the retainer as shown in FIG. 12. FIG. 12 illustrates a common transmission arrangement with two ropes for neutral lines hanging from an upper crossbar above three ropes for power lines hanging from a lower crossbar.

The rope brake apparatus is typically used only on poles adjacent a road where a drooping rope would require the road to be closed and/or place a worker at risk. For example, FIG. 2 shows four rope brake apparatuses 10 on the pole on the far (right) side of the road. Conventional pulleys 140 are on the other poles. However, the rope brake apparatus can be advantageously used wherever a drooping rope would be a problem.

I claim:

1. A method for installing power lines, the method comprising:
    (a) obtaining a power pole with a receiver and an insulator mounted in a stationary position;
    (b) obtaining a rope with a leading end;
    (c) obtaining a power line with a leading end;
    (d) attaching to the receiver on the power pole a rope brake apparatus comprising:
        (i) a base having a downwardly extending projecting member for attachment to the receiver; and
        (ii) a pair of opposed cam cleats mounted on the base adjacent each other for allowing movement of the rope between them in one direction and for preventing movement of the rope between them in an opposite direction;
    (e) pulling the rope in a first direction through the cam cleats of the rope brake apparatus;
    (f) attaching the leading end of the rope to the leading end of the power line;
    (g) disconnecting the rope from the rope brake apparatus;
    (h) pulling the rope and the attached power line in a second direction, which direction is opposite the first direction; and
    (i) attaching the power line to the insulator.

2. The method of claim 1 wherein the power pole comprises a crossbar and wherein the receiver is attached to the crossbar.

3. The method of claim 1 wherein the rope brake apparatus additionally comprises a retainer for holding the rope between the cam cleats.

\* \* \* \* \*